United States Patent Office 3,448,064
Patented June 3, 1969

3,448,064
POLYMERIZATION OF ALKYLENE OXIDES USING A BINARY CATALYST SYSTEM CONTAINING AN ORGANOMETALLIC COMPOUND AND BORIC ACID
Hideo Tomomatsu, Austin, Tex., assignor to Jefferson Chemical Company, Inc., Houston, Tex., a corporation of Delaware
No Drawing. Filed Aug. 21, 1967, Ser. No. 661,839
Int. Cl. C08g 23/14
U.S. Cl. 260—2     8 Claims

ABSTRACT OF THE DISCLOSURE

High molecular weight polymers having a high degree of crystallinity are obtained from the polymerization of cyclic alkylene oxides employing a binary catalyst system consisting of an organometallic compound of the formula $MZX_{y-1}$ and boric acid. Cyclic alkylene oxides employed are those containing oxygen-carbon rings consisting of one oxygen atom in a ring with two or three carbon atoms.

Background of the invention

This invention is concerned with the polymerization of cyclic alkylene oxides using a binary catalyst system of an organometallic compound and boric acid.

The polymerization of alkylene oxides is well known. For many years low molecular weight polymers have been obtained by the polymerization of alkylene oxides in the presence of alkaline catalysts. More recently, efforts have been made to obtain tough, solid polymeric alkylene oxides having molecular weights of one million or more.

When alkylene oxides having side chains, such as propylene oxide and epichlorohydrin, are employed, the polymerization may yield both stereoregular and stereoirregular polymers, depending mainly on the polymerization catalyst employed. Stereoregular polymers are crystalline, while stereoirregular polymers are amorphous. For some purposes, crystalline polymers are more desirable. Thus, at times it is important not only to obtain polymers of extremely high molecular weights but also to obtain polymers containing a high percentage of stereoregular polymer.

Organometallic compounds of the type employed in my catalyst system (specifically, diethyl zinc) have been reported to have no catalytic activity in the polymerization of oxides when used alone (J. Furukawa et al., J. Polymer Sci., 36, 542 (1959)). Therefore, it was entirely unexpected that by mixing these organometallic compounds with boric acid, which also has no catalytic activity when used alone, a high yield of high molecular weight polymer containing a high percentage of stereoregular polymer could be obtained.

Summary of the invention

I have now developed a method for the polymerization of cyclic alkylene oxides whereby high molecular weight polymers having a high degree of crystallinity may be obtained. In accordance with my method a binary catalyst system of boric acid and an organometallic compound as defined hereinbelow is employed.

Description of the preferred embodiment

One component of my catalyst system is boric acid. Commercially available boric acid may be employed without the need for purification.

The organometallic compound to be used in conjunction with the boric acid is defined as one having the formula $MZX_{y-1}$ wherein M is a metal belonging to Groups II and III, and preferably Groups II-B and III-A, of the Periodic Table, Z is a member selected from the group consisting of alkyl, cycloalkyl and aryl groups containing from 1 to 18 carbon atoms, X is selected from the class consisting of hydrogen, halogen, Z and alkoxy and aryloxy groups containing 1 to 18 carbon atoms, and y is a whole number equal to the valence of M. This metallic compound will contain at least one alkyl or aryl group and may contain additional such groups or alkoxy, aryloxy, hydrogen or a halogen such as chlorine, bromine or iodine. Examples of M include magnesium, calcium, strontium, barium, zinc, cadmium and aluminum. Typical examples of Z include methyl, ethyl, phenyl, butyl, hexyl, cyclobutyl, cyclohexyl and tolyl. Z is preferably an alkyl group. In addition to the above groups, X may be hydrogen, chlorine, bromine, iodine, ethoxy, propoxy, butoxy and phenoxy. Especially preferred organometallic compounds are diethyl zinc and triethyl aluminum. Other acceptable compounds include diethyl aluminum hydride, ethyl aluminum dichloride, diphenyl zinc, methyl zinc phenoxide, dilauryl cadmium, triethyl gallium, phenyl cyclohexyl beryllium and dibenzyl cadmium.

The cyclic alkylene oxides that may be polymerized by my process are those containing oxygen-carbon rings in which one oxygen atom is combined with two or three carbon atoms in the ring. The ring carbon atoms may be substituted with alkyl, aryl, cycloalkyl, alkoxyl and haloalkyl groups. The most common cyclic alkylene oxides are those containing the three-membered oxirane ring. Examples of such oxides include ethylene oxide, 1,2-propylene oxide, 1,2-butylene oxide, 2,3-butylene oxide, 1,2-dodecene oxide, styrene oxide, epichlorohydrin and allyl glycidyl ether. A typical four-membered alkylene oxide is 1,3-propylene oxide, commonly referred to as oxetane. Other such cyclic oxides include 3,3-dimethyloxetane, 3,3-diethyloxetane and 3,3-di(chloromethyl)-oxetane.

The concentration of the mixed catalyst may be varied from 1 to 20 wt. percent or higher based on the weight of the monomeric oxide. It is preferred to use from about 3 to 15 wt. percent catalyst. The weight ratio of boric acid to organometallic compound in the catalyst may be varied from about 10:1 to 1:10 with the preferred ratio being from about 1:1.2 to 1:8 with a ratio of about 1:3 being particularly preferred.

The polymerization may be run at a temperature within the range of 0° to 200° C.; however, it is preferred to employ temperatures within the range of about 25° to about 150° C. To avoid loss of volatile components, the reaction is normally conducted in a closed vessel. The particular pressure at which the reaction is conducted is not critical, and ambient pressures are generally employed.

The polymerization reaction should be conducted in a dry, inert atmosphere. A dry, inert solvent is employed. The solvent may be an aliphatic or aromatic hydrocarbon or an ether. Typical solvents include cyclohexane, n-hexane, petroleum ether, pentane, heptane, benzene, toluene, diethyl ether and dipropyl ether.

After the polymerization is complete the catalyst may be quenched by the addition of a suitable amount of a lower aliphatic alcohol, preferably isopropyl alcohol, in solution in an inert solvent as described above. Generally, sufficient alcohol is used to react with both components of the catalyst system. The presence of the quenched catalyst in the polymer does not adversely affect the polymer properties. It is also possible to add a small amount of antioxidant (usually 0.3 to 3.0 wt. percent based on the monomeric oxide) in solution in a solvent to increase the stability of the polymer.

To demonstrate the unexpected synergistic effect shown by my two-component catalyst system, propylene oxide was polymerized using boric acid alone, diethyl zinc alone, and a combination of boric acid with diethyl zinc. These polymerizations were conducted in cyclohexane solvent at 80° C. for a period of 24 hours. The results of these experiments are summarized in Table 1. The intrinsic viscosity of the polymer was observed in toluene at 25° C. Fractionation of the polymer to determine the crystalline content was carried out by dissolving the polymer in sixty times its weight of acetone and precipitating the crystalline fraction by cooling the solution to −45° C.

TABLE 1

| Run No. | Compound | Conc. based on propylene oxide, percent | Total polymer Yield, percent | Total polymer Intrinsic viscosity | Crystalline fraction, percent |
|---|---|---|---|---|---|
| 1 | Boric acid | 3.2 | 0 | | |
| 2 | Diethyl zinc | 3.8 | 0 | | |
| 3 | Boric acid plus diethyl zinc | 1.6+4.8 | 80 | 1.65 | 35 |

My invention will be further illustrated by the following examples.

Example I

Propylene oxide (50 grams), boric acid (0.8 gram) and freshly distilled, dried cyclohexane (200 grams) were mixed together in a 500 ml. Pyrex glass pressure bottle under dry nitrogen. A 25% solution of diethyl zinc in heptane (9.6 grams) was then added. The pressure bottle was closed by a stainless steel cap equipped with a Teflon O-ring and was subjected to shaking in an oil bath at 80° C. for 24 hours. The reaction mixture was mixed with 50 ml. of cyclohexane which contained 0.25 gram of isopropyl alcohol and 0.25 gram of dibutyl-para-cresol. The reaction mixture so obtained was a white, highly viscous semisolid. After evaporation of the solvent there was obtained 42 grams of a white polymer. The intrinsic viscosity of the polymer determined in toluene at 25° C. was 1.65.

Example II

The procedure of Example I was repeated using 50 grams of ethylene oxide, 1.05 grams of boric acid, 14.3 grams of 25% diethyl zinc in hexane and 200 grams of freshly distilled, dried cyclohexane. There was obtained 54.8 grams (100% yield) of a tough, white polymer having a melting point of 57–60° C. and an intrinsic viscosity of 0.2 determined in water at 25° C.

Example III

A mixture of 0.8 gram of boric acid, 200 ml. of dried benzene and 7.4 grams of a 25% triethyl aluminum solution in toluene was stirred under a nitrogen atmosphere and 50 grams of freshly distilled epichlorohydrin was added. The reaction vessel was closed with a stainless steel cap equipped with a Teflon O-ring and subjected to shaking in an oil bath at 80° C. for 24 hours. After evaporation of the solvent there was obtained 17 grams of a white, rubbery polymer.

I claim:

1. A method for the polymerization of a cyclic alkylene oxide having an oxygen-carbon ring in which the oxygen atom is joined with 2 carbon atoms in the ring, which comprises mixing said oxide at 0° to 200° C. in an inert atmosphere with from 1 to 20 wt. percent based on the weight of oxide of a binary catalyst system of
   (A) boric acid with
   (B) an organometallic compound having the formula $$MZX_{y-1}$$

wherein M is a metal from Groups II and III–A of the Periodic Table, Z is selected from the class consisting of aryl, cycloalkyl and alkyl groups containing from 1 to 18 carbon atoms, X is selected from the class consisting of hydrogen, halogen, Z and alkoxy and aryloxy groups containing 1 to 18 carbon atoms, and $y$ is an integer equal to the valence of M, the weight ratio of boric acid to organometallic compound in the catalyst mixture being within the range of from 10:1 to 1:10.

2. A method as in claim 1 wherein M is a metal from Groups II–B and III–A of the Periodic Table.

3. A method as in claim 2 wherein the temperature is within the range of 25° to 150° C., the catalyst concentration is within the range of 3 to 15 wt. percent based on the weight of oxide and the weight ratio of boric acid to organometallic compound is within the range of 1:1.2 to 1:8.

4. A method as in claim 2 wherein Z is an alkyl group containing 1 to 18 carbon atoms.

5. A method as in claim 4 wherein the organometallic compound is diethyl zinc.

6. A method as in claim 5 wherein the temperature is within the range of 25° to 150° C., the concentration of the catalyst mixture is between 3 to 15 wt. percent based on the weight of oxide and the weight ratio of boric acid to diethyl zinc is between 1:1.2 and 1:8.

7. A method as in claim 4 wherein the organometallic compound is triethyl aluminum.

8. A method as in claim 7 wherein the temperature is within the range of 25° to 150° C., the catalyst concentration is between 3 to 15 wt. percent based on the weight of oxide and the weight ratio of boric acid to triethyl aluminum is between 1:1.2 and 1:8.

References Cited

UNITED STATES PATENTS 2,870,100 1/1959 Stewart et al.
2,895,922 7/1959 Goddu.
3,026,216 3/1962 Sookne.

WILLIAM H. SHORT, *Primary Examiner.*

T. PERTILLA, *Assistant Examiner.*

U.S. Cl. X.R.

252—431; 260—88.3